United States Patent [19]
Urakami

[11] Patent Number: 5,161,631
[45] Date of Patent: Nov. 10, 1992

[54] SUCTION DEVICE CAPABLE OF MOVING ALONG A SURFACE

[76] Inventor: Fukashi Urakami, Maruyoshi Bldg. 608, 17-24 Konandai 4-chome, Konan-Ku, Yokohama, Japan

[21] Appl. No.: 616,995

[22] Filed: Nov. 21, 1990

[30] Foreign Application Priority Data

Nov. 27, 1989 [JP] Japan .................. 1-306893
Jan. 17, 1990 [JP] Japan .................. 2-8042
Jan. 30, 1990 [JP] Japan .................. 2-20221

[51] Int. Cl.⁵ .................. B60B 39/00; B62D 57/024
[52] U.S. Cl. .................. 180/164; 180/8.1; 180/8.5; 180/8.6; 180/901
[58] Field of Search ............. 180/164, 8.1, 8.3, 8.5, 180/8.6, 901

[56] References Cited

U.S. PATENT DOCUMENTS

| | | |
|---|---|---|
| 4,321,976 | 3/1982 | Reinke et al. .................. 180/8.5 |
| 4,719,659 | 1/1988 | Urakami . |
| 4,809,383 | 3/1989 | Urakami . |
| 4,860,400 | 8/1989 | Urakami . |
| 4,919,223 | 4/1990 | Egger et al. .................. 180/8.1 |
| 4,926,957 | 5/1990 | Urakami . |
| 4,934,475 | 6/1990 | Urakami . |
| 4,997,052 | 4/1991 | Urakami . |
| 5,014,803 | 5/1991 | Urakami . |

FOREIGN PATENT DOCUMENTS

| | | |
|---|---|---|
| 0010034 | 4/1980 | European Pat. Off. . |
| 0084012 | 7/1983 | European Pat. Off. . |
| 0324297 | 7/1989 | European Pat. Off. . |
| 2529131 | 12/1983 | France . |
| 85085 | 5/1985 | Japan .................. 180/8.1 |
| 36586 | 2/1989 | Japan .................. 180/8.1 |
| 36588 | 2/1989 | Japan .................. 180/901 |
| 141184 | 6/1989 | Japan .................. 180/164 |
| 109763 | 4/1990 | Japan .................. 180/8.6 |
| 84/04733 | 12/1984 | PCT Int'l Appl. . |

Primary Examiner—Mitchell J. Hill
Attorney, Agent, or Firm—Beveridge, DeGrandi & Weilacher

[57] ABSTRACT

A device capable of moving along a surface comprising at least two moving units, wherein the units are linked to each other by a coupling means device capable of being stretched and contracted, each of the units having a stating setting mechanism for selectively setting each of the units in a movable state for movement along the surface and in a surface-engaging state on the surface, and when one unit is set in a movable state and the other unit is set in a surface-engaging state and the coupling means is stretched or contracted, the one unit in the movable state is moved along the surface.

24 Claims, 9 Drawing Sheets

SUCTION DEVICE CAPABLE OF MOVING ALONG A SURFACE

FIELD OF THE INVENTION

This invention relates to a device capable of moving along a surface for cleaning such a surface as an inside or outside wall surface, a floor surface or a glass surface in a built structure, or an inside surface of an air-conditioning duct or an inside surface of water supply and drainage pipings.

DESCRIPTION OF THE PRIOR ART

U.S. Pat. No. 4,095,378 discloses a device capable of moving along such a surface while suction-adhering thereto for cleaning the surface of an inside and outside wall of a built structure. This device includes a rigid or semirigid pressure-receiving body, a seal member mounted on the pressure-receiving body and defining a pressure-reduction space in cooperation with the pressure-receiving body and a surface to which the body suction-adheres, and pressure-reduction means for reducing the pressure in said pressure-reduction space. By reducing the pressure of the pressure-reduction space by the pressure-reduction means, the pressure-receiving body suction-adheres to the surface. The pressure-receiving body further has mounted thereon a traveling mechanism including a plurality of wheels to be brought contact with the surface and an electric motor for rotating the wheels. Furthermore, the pressure-receiving body has mounted thereon a working mechanism such as means for impinging a cleaning material on the surface.

The conventional device of the type described above, however, involves a number of problems to be solved as described below It is necessary to provide this device with a traveling mechanism including an electric motor and a power transmission means together with a plurality of wheels, and this leads to a relatively large size and cost of the device. It is therefore difficult to reduce the size of the device to a satisfactory extent. Hence, it is difficult to achieve a device which is adapted to advance into an air-conditioning duct or a water supply or drainage piping having a small cross-sectional area and to clean its inside surface. Even in a duct or a pipe having a relatively large cross-sectional area, all the wheels cannot make contact with the surface as is required at an elbow portion, etc., some of the wheels are isolated from the surface, and this may result in a failure to move the device as a whole. It is further necessary to provide a working means such as means for impinging a cleaning material for the cleaning of the surface. This working means further makes the size larger and the cost higher in the device. In addition, when a protrusion such as a glass frame or the like exists on the surface, the conventional device is substantially unable to move over the protrusion.

SUMMARY OF THE INVENTION

It is a principal object of this invention therefore to provide a novel and improved device capable of moving along a surface, which can be manufactured in a smaller size and at a lower cost than the conventional device.

Another object of the invention is to provide a novel and improved device capable of moving along a surface, which can advance into a duct or a pipe having a small cross-sectional area and can move as is required at an elbow portion having a small curvature.

Still another object of this invention is to provide a small-sized and inexpensive novel, and improved device capable of moving along a surface, which can clean the surface without the need to provide a special working means such as a cleaning material impinging means.

Yet another object of this invention is to provide a novel and improved device capable of moving along a surface, which can move over a protrusion which may exist on the surface.

The gist of this invention for achieving the objects of this invention is to (a) joining at least two moving units reciprocally via a coupling means which can be stretched and contracted, and (b) provide each of the moving units with a state setting means for selectively setting the moving units in a movable condition along the surface and in a surface-engaging state on the surface.

Thus, according to this invention, there is provided a device capable of moving along a surface, said device comprising at least two moving units linked to each other via a coupling means capable of stretching and contracting and a state setting means for selectively setting each of said units in a movable state along the surface and in a surface-engaging state on the surface, wherein when one unit is set in a movable state and the other unit is set in a surface-engaging state and the coupling means is stretched or contracted, said one unit is moved along the wall surface.

Preferably, each of the moving units includes a rigid or semirigid main body, a seal member mounted on said body for defining a pressure-reduction space in cooperation with the main body and the surface, and a pressure-reduction means for reducing the pressure of the pressure-reduction space. Also, preferably, an engaging member is mounted on the main body of the moving unit, and the state setting means is constructed of a traveling means adapted to be positioned selectively at a protruding position and at a receded position. When the traveling means is positioned at the protruding positioning, the traveling means makes contact with the surface and the engaging member is isolated from the surface to create the above movable state. When the traveling means is positioned at the receded position, the traveling means is isolated from the surface, and the engaging member makes contact with the surface to create the surface engaging state. The traveling means is mounted on the main body via a cylinder mechanism. By stretching or contracting the cylinder mechanism, the traveling means can be positioned selectively at the protruding position and at the receded position.

A braking means is disposed which applies a braking action selectively to the traveling means contacted with the surface. When a braking action is not applied to the traveling means, the movable state is set, and the engaging state may be set when a braking action is applied to the traveling means.

The coupling means joining the moving units to each other is preferably constructed from a cylinder mechanism, especially a pair of cylinder means arranged parallel to each other. The cylinder mechanism is desirably connected to each of the moving units via a universal coupling.

Preferably, while the main body of each of the moving units is linked to the coupling means via a selective isolating means and one moving unit is positioned at a site at which a part of the one moving unit makes contact with the surface by the selective isolating means for the one moving unit, the other moving unit in its entirety can be isolated from the surface by the selective isolating means for the other moving unit. The selective isolating means, too, can be constructed of a cylinder mechanism.

If, in the device of this invention, one unit is set in the movable state and the other unit is set in the engaging state, and the coupling means is stretched or contracted, the one unit is moved along the surface. Accordingly, by reversing the movable state and the engaging state of two units alternately and stretching or contracting the coupling means, the device can be moved along the surface. Thus, there is no need to provide a travelling mechanism including an electric motor and a power transmission means, and the device can be built sufficiently in a small size and at an inexpensive cost.

If a cylinder mechanism constituting a coupling means is linked to the main body of each of the units via a universal coupling, each of the units can properly be moved according to the curvature of the surface. Accordingly, even when the surface is curved with a small curvature, the device can retain its contact with the surface very well.

If, when one unit is prescribed in a movable state and moves along the surface, and a specific site of the seal member mounted on the main body of the unit is maintained, as is required, in contact with the surface, a cleaning job is performed on the surface as a result of movement of the specific site of the seal member in contact with the surface.

If, in the movement of one unit along the surface, this unit is kept isolated from the surface by the selective isolating means, the unit can move over a protrusion such as a glass frame existing on the surface.

DETAILED DESCRIPTION OF THE PREFERRED EMBODIMENTS

The present invention will be described further in detail with reference to the accompanying drawings which show preferred embodiments of the device of this invention.

Figure 1:
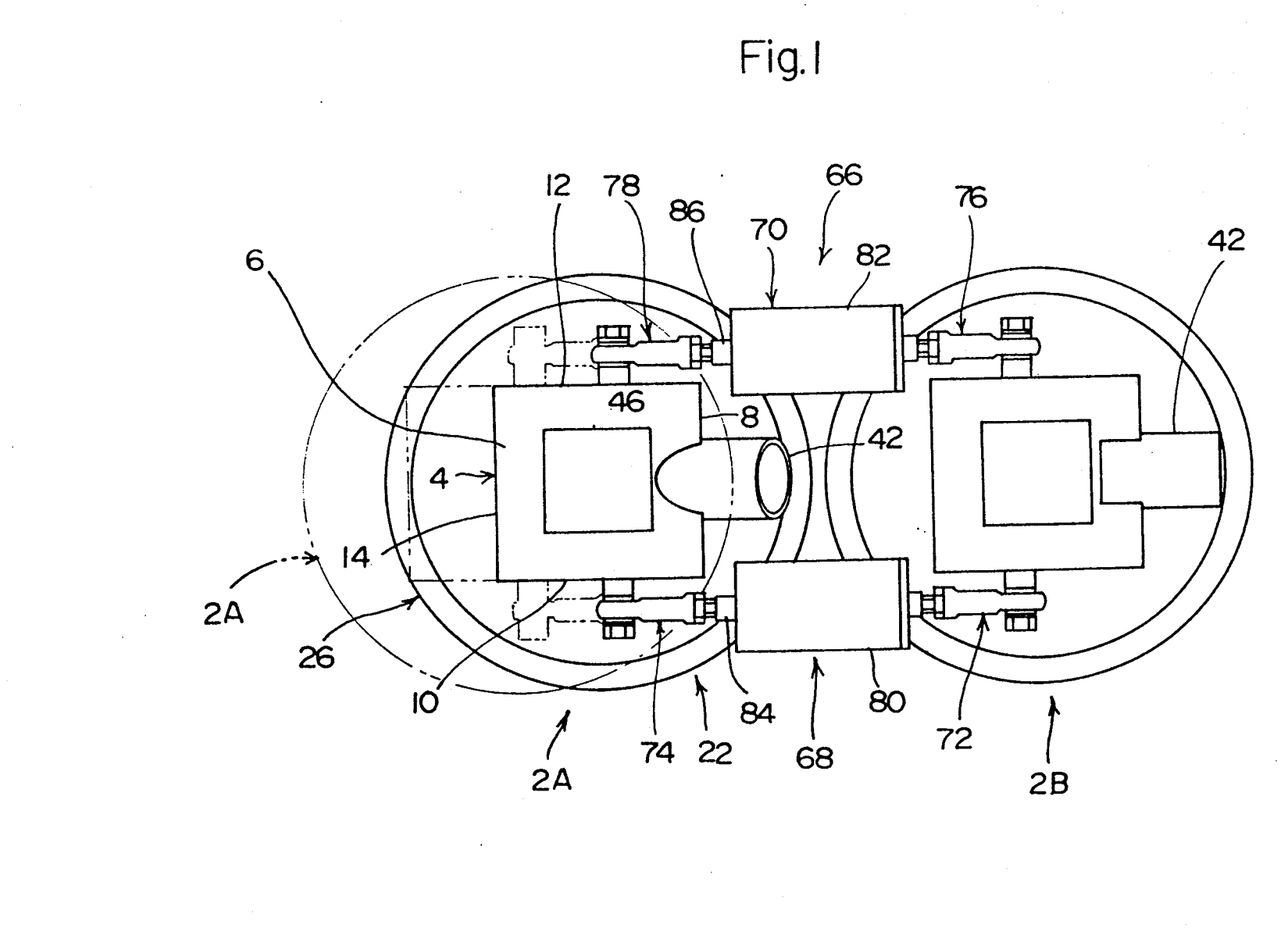
FIG. 1 is a plan view showing one specific example of the device constructed in accordance with this invention.
Figure 2:
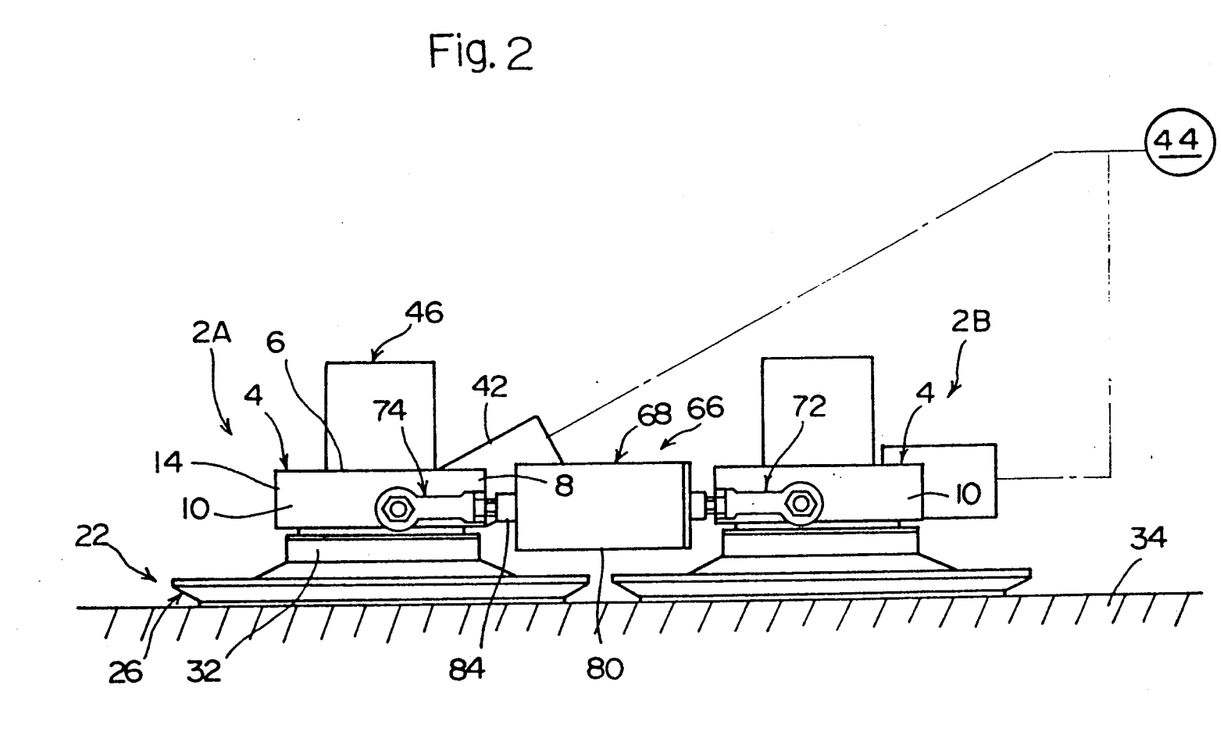
FIG. 2 is a side elevation of the device of FIG. 1.

With reference to FIGS. 1 and 2, the device constructed in accordance with this invention has two moving units 2A and 2B.

With references to FIGS. 1 and 2 as well as 3 and 4, the moving unit 2A includes a main body 4 formed of a rigid or semirigid material, for example, a metal plate such as a steel plate or a suitable synthetic resin. The main body 4 as a whole is in the shape of a hollow rectangular parallelpipedal tube, and has a rectangular upper side wall 6, four side walls 8, 10, 12 and 14 extending downwardly from four side edges of the upper wall 6, and a bottom wall 16. Centrally in the bottom wall 16 is formed a circular opening 18. To the circular opening 18 is fixed a cylindrical downwardly extending wall 20.

Figure 3:
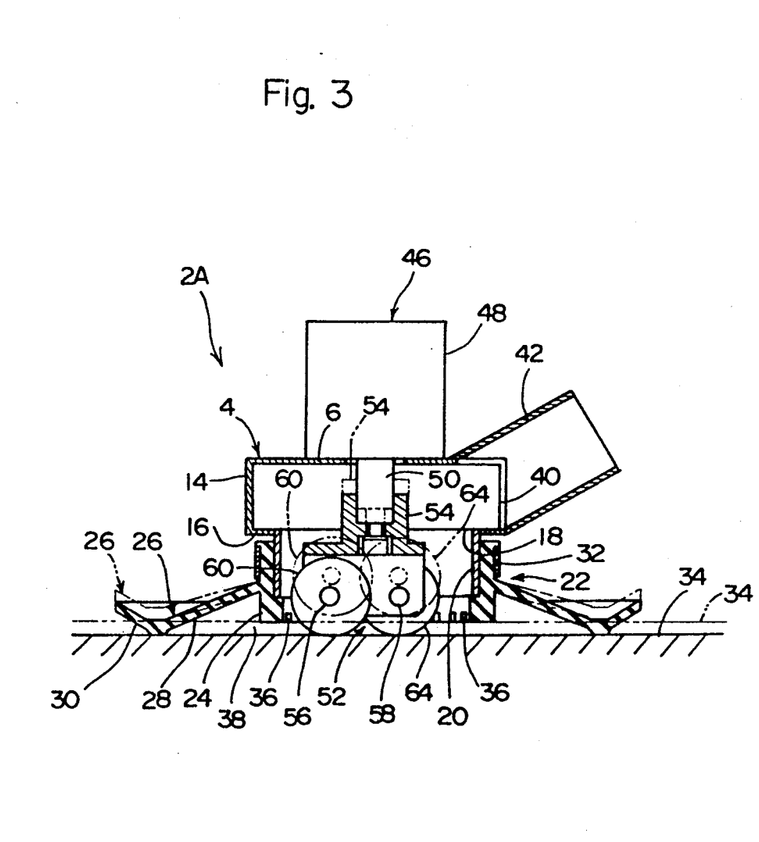
FIG. 3 is a partial sectional view showing part of the device of FIG. 1.
Figure 4:
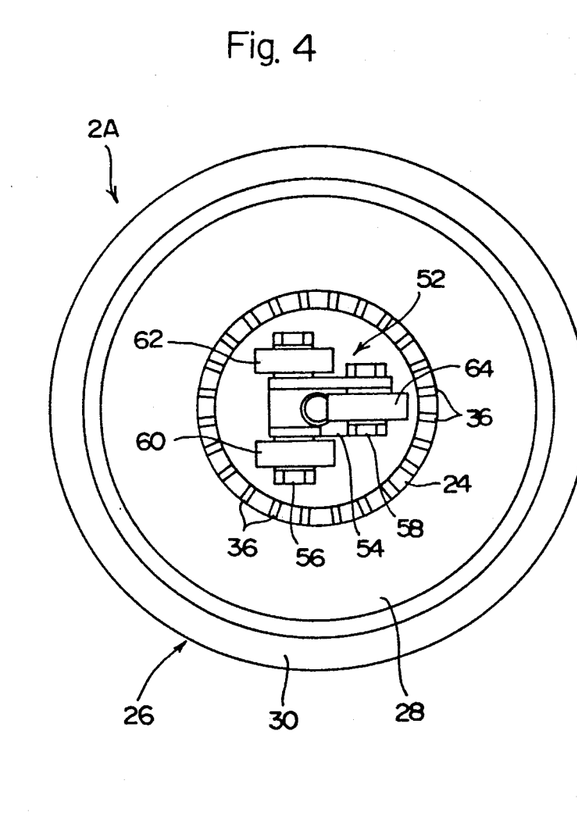
FIG. 4 is a partial bottom view showing part of the device of FIG. 1.

With reference to FIGS. 1 to 4, particularly FIG. 3, the moving unit 2A conveniently includes a member 22 formed preferably of a synthetic rubber such as polyurethane which is relatively pliable and has a relatively high coefficient of friction. The member 22 has a cylindrical base portion 24 and a seal portion 26 extending radially outwardly from the peripheral surface of the cylindrical base portion 24. The seal portion 26 has a truncated conical portion 28 extending radially outwardly in a downwardly inclined direction and an inverted truncated conical portion 30 extending radially outwardly in an upwardly inclined direction from the truncated conical portion 28. The upper half part of the cylindrical base portion 24 of the member 22 is coveringly fitted to the peripheral surface of the cylindrical downwardly extending wall 20 of the main body 4, and is fastened to the cylindrical downwardly extending wall 20 by means of a known metallic fastening band 32 wrapped about the peripheral surface of the cylindrical downwardly extending wall 20. The lower end of the cylindrical base portion 24 of the member 22 constitutes an engaging member to be selectively contacted with a surface 34 to be cleaned, as will be mentioned later on. A plurality of flow channels 36 are formed in a circumferentially spaced relationship in the lower end of the cylindrical base portion 24. Each of the flow channels 36 extends through the lower end portion of the cylindrical base portion 24 and extends in a radial direction. The seal portion 26 of the member 22 constitutes a seal member defining a pressure-reduction space 38 in cooperation with the main body 4 and the surface 34 to be cleaned. In the illustrated embodiments, the boundary portion between the truncated conical portion 28 and the inverted truncated conical portion 30 contacts intimately with the surface 34 to define a substantially closed pressure-reduction space 38. The inverted truncated conical portion 30 of the seal portion 26 is gradually isolated from the surface 34 as the portion 30 extends radially outwardly. Where small protrusions exist on the surface 34 or foreign matter adheres to the surface 34, the seal portion 26 functions as a guiding means at the time of riding over these protrusions or foreign matter. If desired, a plurality of flow channels may be formed in a circumferentially spaced relationship in the boundary portion between the truncated conical portion 28 and the inverted truncated conical portion 30. When such flow channels are formed, dirts or dusts removed from the surface are also introduced into the pressure-reduction space 38 together with a fluid such as air advancing into the pressure-reduction space 38 through the flow channels. Consequently, the dirts and dusts are prevented from scattering in a nearby environment (in which case to maintain the pressure-reduction space 38 under reduced pressure, it is necessary to suck more fluid from the pressure-reduction space 38 than the fluid that advances into the pressure-reduction space 38 through the flow channels).

With reference to FIGS. 1 to 3, the main body 4 of the moving unit 2A has formed a flow opening 40 existing in its upper wall 6 to the side wall 8, and to the flow opening 40 is fixed a flow pipe 42. The flow pipe 42 is connected to a pressure reduction source 44 (FIG. 2) via a suitable connecting means (not shown) such as a flexible hose. The pressure reduction source 44 which may be constructed of a vacuum pump or an ejector sucks a fluid such as air from the pressure-reduction space 38, and reduces the pressure of the pressure-reduction space 38.

A pneumatic cylinder mechanism 46 is further mounted on the main body 4 of the moving unit 2A. (The cylinder mechanism 46 is connected to a compressed air source via a pneumatic pressure circuit, although it is not shown in the drawings.) As shown clearly in FIG. 3, the cylinder 48 of the cylinder mechanism 46 is fixed to the top surface of the upper wall 6 of the main body 4. A rod 50 of the cylinder mechanism 46 protrudes into the pressure-reduction chamber 38 through the upper wall 6. The rod 50 of this cylinder mechanism 46 has a hexagonal shape in its cross section, and is preferably of the non-rotating type in which the relative rotation of the rod 50 with respect to the cylinder 48 is hampered. A traveling means 52 is mounted on the forward end part of the rod 50 which projects into the pressure-reduction space 38. The traveling means 52 include a supporting member 54 fixed to the forward end portion of the rod 50. This supporting member 54 has mounted thereon rotatably three wheels 60, 62 and 64 via shafts 56 and 58. The cylinder mechanism 46 and the traveling means 52 mounted on the rod 50 of the cylinder mechanism 46 constitute a state setting means which selectively sets the moving unit 2A in a movable state and in a surface-engaging state (the action of the state setting means will be described later on).

The structure of the other moving unit 2B shown in FIGS. 1 and 2 is substantially the same as the moving unit 2A provided that in the illustrated embodiment, for the sake of connecting of a connecting means (not shown) such as a flexible hose, the flow pipe 42 in the moving unit 2B extends to the right direction substantially horizontally in FIG. 2, whereas the flow pipe 42 in the moving unit 2A extends to the right direction in an upwardly inclining state, With reference to FIGS. 1 and 2, the two moving units 2A and 2B are linked to each other by a coupling means shown in its entirety by 66. The illustrated coupling means 66 is constructed of a pair of pneumatic cylinder mechanisms 68 and 70 arranged in parallel with a space therebetween in the vertical direction. (The cylinder mechanisms 68 and 70 are also connected to a compressed air source via a suitable pneumatic circuit, although this feature is not shown in the drawings.) Cylinders 80 and 82 of the cylinder mechanisms 68 and 70 are connected respectively to the side walls 10 and 12 of the main body 4 of the moving unit 2B, and the rods 84 and 86 of the cylinder mechanisms 68 and 70 are connected respectively to the side walls 10 and 12 of the main body 4 of the moving unit 2A. Desirably, the cylinder mechanisms 68 and 70 and the main bodies 4 of the moving units 2A and 2B are connected via universal couplings which permit relative tilting movement in any desired direction. In the illustrated embodiments, they are connected via joining mechanisms 72, 74, 76 and 78 including ball-and-socket joints. In more details, the cylinder 80 of the cylinder mechanism 68 is fixed to one end of the joining mechanism 72, and the other end of the joining mechanism 72 is fixed to the side wall 10 of the main body 4 of the moving unit 2A. Furthermore, the cylinder 82 of the cylinder mechanism 70 is fixed to one end of the joining mechanism 76 and the other end of the joining mechanism 76 is fixed to the side wall 12 of the main body 4 of the moving unit 2B. The rod 86 of the cylinder mechanism 70 is fixed to one end of the joining mechanism 76, and the other end of the joining mechanism 78 is fixed to the side wall 12 of the main body 4 of the moving unit 2A.

Now, with reference to FIGS. 1 to 3, the operation of the device described above will be described. In starting to operate the device of this invention, a pair of cylinder mechanisms 68 and 70 constituting the coupling means 66 are in the contracted state (in the state shown by a solid line in FIGS. 1 and 2). The cylinder mechanism 46 disposed in each of the moving units 2A and 2B is in the contracted state (in the state shown by a two-dot chain line in FIG. 3). In this state, the pressure reduction source 44 is energized to maintain the pressure-reduction space 38 in each of the moving units 2A and 2B under reduced pressure. As shown by a two-dot chain line in FIG. 3, when the cylinder mechanism 46 constituting the state setting means in the moving units 2A and 2B is contracted, the wheels 60, 62 and 64 are receded and the engaging member (that is, the lower end portion of the cylindrical base portion 24 of the member 22) is contacted with the surface 34, and the wheels 60, 62 and 64 are isolated from the surface 34. Accordingly, the pressure of the fluid acting on the main body 4 owing to the difference in pressure between the inside and outside of the pressure-reduction space 38 is transmitted to the surface 34 via the engaging member, and the engaging member is press-contacted with the surface 34. Since the seal member (namely, the seal portion 26 of the member 22) is relatively thin and can be easily moved toward and away from the surface 34, the seal member is placed in intimate contact with the surface 34 by the fluid pressure acting on the seal member itself (more specifically on the truncated conical portion 28 of the seal portion 26) owing to the difference in pressure between the inside and outside of the pressure-reduction space 38. In a state where the lower end portion of the cylindrical base portion 24 of the member 22 is kept in press contact with the surface 34, the inside and outside of the cylindrical base portion 24 communicate with each other through the flow channels 36 formed at the lower end portion of the cylindrical base portion 22. Thus, the pressure of the space surrounded by the seal portion 26 is also reduced. If the engaging member (the lower end portion of the cylindrical base portion 24 of the member 22) is press-contacted with the surface 34, the relative movement of the engaging member and the surface 34 is resisted by the considerably large frictional force acting between the two. Hence, the moving units 2A and 2B are kept in a surface-engaging state in which both of them cannot easily move along the surface 34. Then, the cylinder mechanism 46 alone in the moving unit 2A is stretched to create the state shown by a solid line in FIG. 3. As a result, the wheels 60, 62 and 64 are projected beyond the cylindrical base portion 24 of the member 22, and the engaging member (the lower end portion of the cylindrical base portion 24 of the member 22) is moved away from the surface 34, and the wheels 60, 62 and 64 are contacted with the surface 34. The seal member (i.e., the seal portion 26 of the member 22) continues to be in contact with the surface 34 by the fluid pressure acting on itself. In a state where the engaging member is isolated from the surface 34 and the wheels 60, 62 and 64 are kept in contact with the surface 34, the moving unit 2A is set in a movable state in which the movable unit 2A can be sufficiently easily moved along the surface 34 by the rotation of the wheels 60, 62 and 64. Thus, when one moving unit 2A is set in a movable state and the other 2B in a surface-engaging state and a pair of cylinder mechanisms 68 and 70 constituting the coupling means 66 are stretched, the moving unit 2B is not moved with respect to the surface 34 but is maintained in a stationary state, while as shown in FIG. 1 by a two-dot chain line, the moving unit 2A is moved to the left in FIG. 1 according to the stretching of the pair of cylinder mechanisms 68 and 70. During this movement of the moving unit 2A, a part of the seal portion 26 of the member 22, that is, the boundary site between the truncated conical portion 28 and the inverted truncated conical portion 30 is maintained in intimate contact with the surface 34. Accordingly, a rubbing action is applied to the surface 34 by a specific site of the seal portion 26 to clean the surface 34. If the moving unit 2B is set in a surface-engaging state, the moving unit 2A is set in a movable state and a pair of cylinder mechanisms 68 and 70 are contracted the moving unit 2A is returned to the original position shown by a solid line in FIG. 1. Hence, as required, it is possible to move the moving unit 2A repeatedly between the position in FIG. 1 shown by a solid line and the position in FIG. 1 shown by a two-dot chain line, and at a result, a specific site of the surface 34 can be repeatedly cleaned.

Then, in a state where the moving unit 2A is moved to the position shown by a two-dot chain line in FIG. 1, the cylinder mechanism 46 in the moving unit 2B is stretched to create the state shown by a solid line in FIG. 3 and at the same time, the cylinder mechanism 46 in the moving unit 2A is contracted to create the state shown by a two-dot chain line in FIG. 3. As a result, contrary to the case described above, the moving unit 2B is set in a movable state and the moving unit 2A in a surface-engaging state. If in this state, a pair of cylinder mechanisms 68 and 70 constituting the coupling means 66 are contracted, the moving unit 2A is kept stationary at the position shown by a two-dot chain line in FIG. 1, but the moving unit 2B is moved to the position shown by a two-dot chain line in FIG. 1. During this movement of the moving unit 2B, a part of the seal portion 26 (i.e., the boundary site between the truncated conical portion 28 and the inverted truncated conical portion 30) is maintained in contact with the surface 34, and therefore, a rubbing action is applied on the surface 34 by a specific site of the seal portion 26 to clean the surface 34. If a pair of cylinder mechanisms 68 and 70 are stretched while the moving unit 2A is set in a surface-engaging state and the moving unit 2B in a movable state, the moving unit 2B is returned to the position shown by a solid line in FIG. 1. Accordingly whenever need arises, the moving unit 2B can be moved repeatedly between the position shown by a solid line in FIG. 1 and the position shown by a two-dot chain line in FIG. 1, and thus, a specific region of the surface 34 can be repeatedly cleaned. If in a state where the moving unit 2B is moved to the position shown by a two-dot chain line in FIG. 1, the moving unit 2A is again set in a movable state the moving unit 2B in a surface engaging state, and the pair of the cylinder mechanisms 68 and 70 constituting the coupling means 66 are stretched, the moving unit 2A is moved further to the left from the position shown by a two-dot chain line in FIG. 1. By moving the moving units 2A and 2B successively in this way, the device as a whole can be moved as required, and during this movement the surface 34 can be cleaned successively. To make the cleaning job of rubbing the surface 34 by the seal portion 26 of the member 22 more effective, it is possible, if desired, to embed a number of abrasive grans or adhere abrasive cloths at a required site of the seal portion 26.

Figure 5:
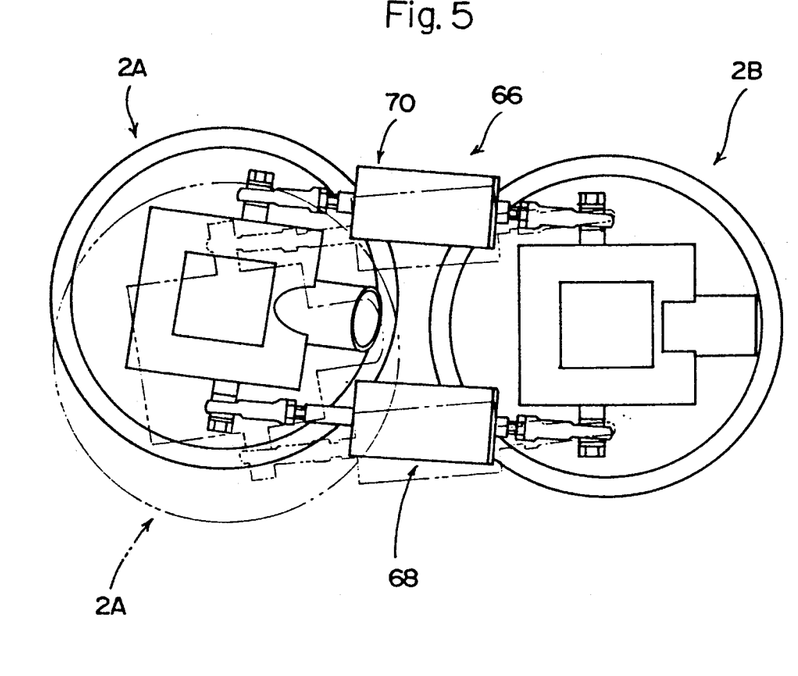
FIG. 5 is a plan view for illustrating the action of the device of FIG. 1.

To swivel the device in a required direction instead of moving it straightforwardly, either one of the cylinder mechanisms 68 and 70 constituting the coupling means 66 may be stretched or contracted. For example, if the moving unit 2A is set in a movable state and the moving unit 2B in a surface-engaging state, and only one cylinder mechanism 68 is stretched, the moving unit 2A is moved to the left in an upwardly inclining direction as shown by a solid line in FIG. 5. Conversely, if only the cylinder mechanism 70 is stretched, the moving unit 2A is moved to the left in a downwardly inclining direction as shown by a two-dot chain line in FIG. 5.

In the device described above, the pair of cylinder mechanisms 68 and 70 constituting the coupling means 66 are linked to the main bodies 4 of the moving units 2A and 2B via the joining mechanisms 72, 74, 76 and 78 including ball-and-socket joints. Accordingly, each of the moving units 2A and 2B can move tiltingly in any desired direction with respect to the other without being restrained by the other. Hence, even if the surface 34 is a curved surface having a relatively small curvature, the moving unit 2A and 2B can properly move tiltingly according to the curved state of the surface 34 and can be moved along the surface 34 while keeping suction-adhering well to the surface 34 without dropping.

Figure 6:
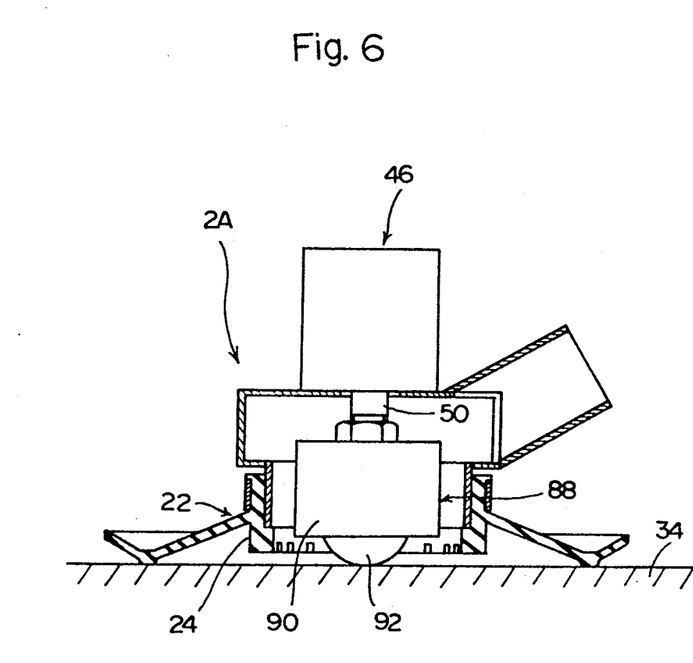
FIG. 6 is a partial sectional view of an embodiment of the present invention with a modified traveling means using a ball caster.
Figure 7:
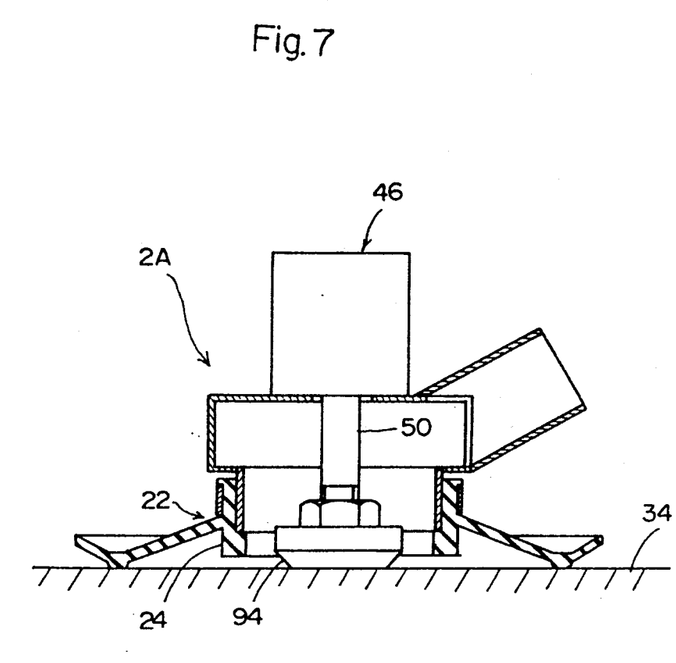
FIG. 7 is a partial sectional view of an embodiment of the present invention with a modified traveling means using a sliding member.
Figure 8:
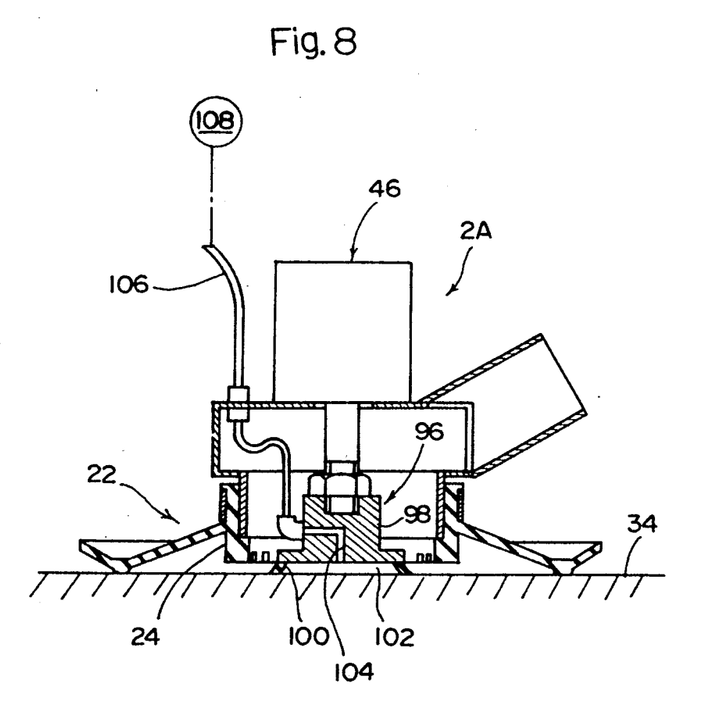
FIG. 8 is a partial sectional view of an embodiment of the present invention with a modified traveling means using a fluid cushioning means.

FIGS. 6 to 8 show modified examples of the traveling means.

In the modified example shown in FIG. 6, the forward end portion of the rod 50 of the cylinder mechanism 46 has fixed thereto a case 90 of a known ball caster 88. In a state where the cylinder mechanism 46 is stretched, a rotatable ball 92 protruding downwardly from the case 90 makes contact with the surface 34. Thus, the moving unit 2A is set in a movable state. When the cylinder mechanism 46 is contracted, the ball 92 of the ball caster 88 is moved away upwardly from the surface 34, and the engaging member (i.e., the lower end portion of the cylindrical base portion 24 of the member 22) is kept in press contact with the surface 34, and at a result, the moving unit 2A is set in a surface-engaging state.

In the modified example shown in FIG. 7, a sliding member 94 is fixed to the forward end portion of the rod 50 of the cylinder mechanism 46. The lower half portion of the sliding member 94 is built in an inverted truncated conical shape. At least the lower half part of this sliding member 9 is formed from a material having a low coefficient of friction such as an acetal resin impregnated with a lubricant. It is important that the sliding member 94 should function as a "sleigh" which smoothly slides over the surface 34. When the cylinder mechanism 46 is in a stretched state, the sliding member 94 contacts the surface 34, and thus the moving unit 2A is set in a movable state. When the cylinder mechanism is contracted, the sliding member 94 is moved away from the surface 34 upwardly, and the engaging member (i.e., the lower end portion of the cylindrical base portion 24 of the member 22) is kept in press contact with the surface 34, and thus, the moving unit 2A is set in a surface-engaging state.

In the modified example shown in FIG. 8, a known high-pressure fluid cushioning means 96 is fixed to the forward end portion of the rod 50 of the cylinder mechanism 46. The cushioning means 96 has a main portion 98 fixed to the forward end portion of the rod 50. A downwardly protruding annular seal 100 is attached to the peripheral edge of the circular lower surface of the main portion 98. In the illustrated state where the cylinder mechanism 46 is stretched, the annular seal contacts the surface 34, and in cooperation with the main portion 98 and the surface 34, defines a substantially closed pressurized space 102. In the main portion 98, a flow passage 104 opening in its bottom surface is formed. This flow passage 104 is connected to the compressed fluid source 108 via a flexible hose 106. The compressed fluid supplied from the compressed fluid source 108 is discharged into the pressurized space 102. Thus, a high-pressure fluid cushion is created in the pressurized space 102 to maintain the moving unit 2A in an afloat condition. Hence, the moving unit 2A is set in a movable state where the moving unit 2A can easily move along the surface 34. When the cylinder mechanism is contracted and the supply of the compressed fluid is stopped, the seal 100 of the cushioning means 96 is moved away from the surface 34, and the engaging member (i.e. the lower end portion of the cylindrical base portion 24 of the member 22) is press-contacted with the surface 34. Thus, the moving unit 2A is set in a surface-engaging state. When the high-pressure fluid cushioning means 96 is provided as the traveling means, the moving unit 2A can be set in a surface-engaging state by simply stopping the supply of the compressed fluid instead of contracting the cylinder mechanism 46. When the supply of the compressed fluid is stopped, the high-pressure cushion in the pressurized space 102 vanishes and the bottom surface of the main portion 98 directly contacts the surface 34, and therefore, it is comparatively difficult for the moving unit 2A to move along the surface 34, and a surface-engaging state is created. Accordingly, when the high-pressure cushioning means 96 is used, the high-pressure cushioning means 96 may be directly attached to the main body 4 instead of fixing it to the main body 4 via the cylinder mechanism 46. The amount of the compressed fluid used in the high-pressure fluid cushioning means 96 may be very small, and the compressed fluid does not substantially affect the pressure reduction in the pressure-reduction space 38 in the moving unit 2A.

Figure 9:
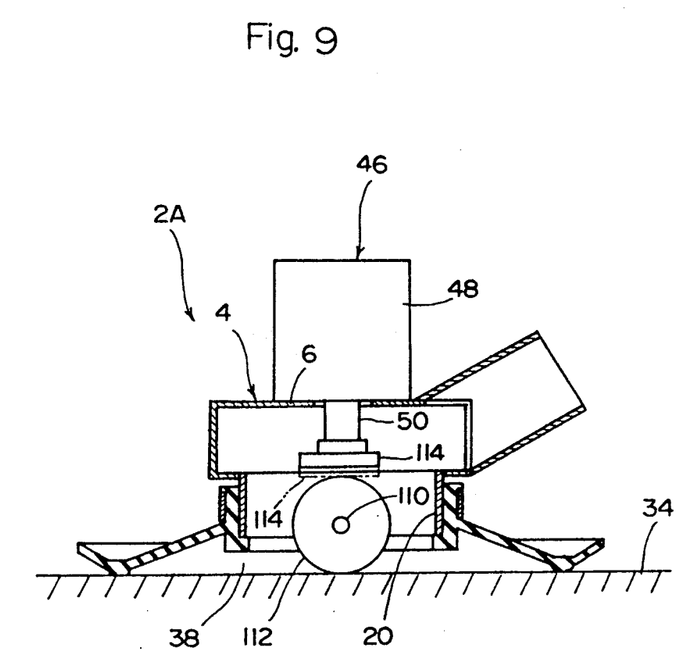
FIG. 9 is a partial sectional view of an embodiment of the present invention with a modified traveling means using one type of a breakable wheel.
Figure 10:
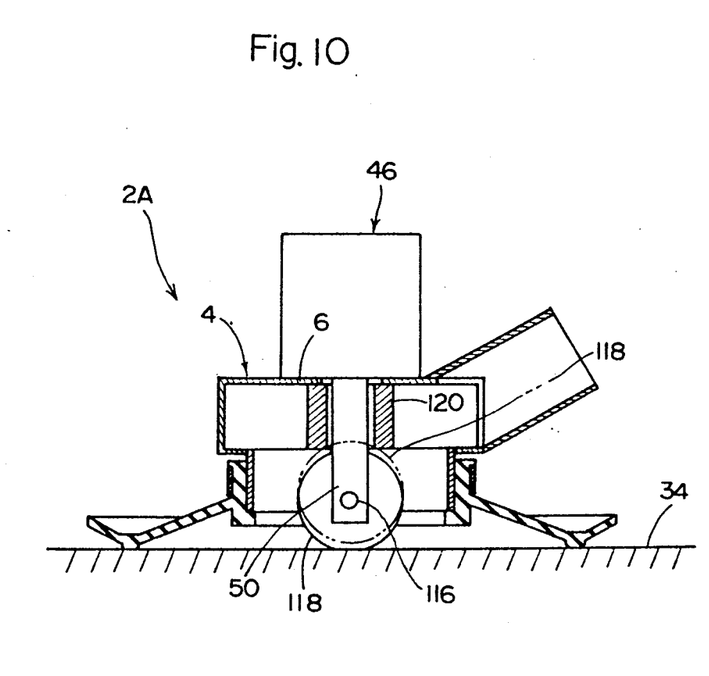
FIG. 10 is a partial sectional view of an embodiment of the present invention with a modified traveling means using another type of breakable wheel.

FIGS. 9 and 10 show modified examples of the state setting means.

In the modified example shown in FIG. 9, a supporting shaft 110 is mounted on the cylindrical downwardly extending wall 20 of the main body 4 of the moving unit 2A through a suitable mounting bracket (not shown). A wheel 112 is rotatably mounted on the supporting shaft 110. On the other hand, the cylinder 48 of the cylinder mechanism 46 is fixed to the upper wall 6 of the main body 4, and the rod 50 is projected into the pressure-reduction space 38 through the upper wall 6 of the main body 4. A braking member 114 in the form of a circular plate is fixed to the forward end portion of the rod 50 of the cylinder mechanism 46. The braking member 114 may be made of a material having a large coefficient of friction such as a synthetic rubber. As shown by a solid line in FIG. 9, when the cylinder mechanism 46 is contracted, the braking member 114 is isolated upwardly from the wheel 112. Accordingly the wheel 112 kept in contact with the surface 34 can freely rotate, and the moving unit 2A is set in a movable state. To set the moving unit 2A in a surface-engaging state, the cylinder mechanism 46 is stretched to depress the braking member 114 against the wheel 112 as shown by a two-dot chain line in FIG. 9. As a result, the rotation of the wheel 112 is braked by the braking member 114. Hence, the moving unit 2A of which the wheel 112 under braking makes contact with the surface is set in a state in which its movement along the surface 34 is difficult to start, and thus in a surface-contacting state.

In the modified example shown in FIG. 10, a supporting shaft 116 is mounted on the forward end portion of the rod 50 of the cylinder mechanism 46, and a wheel 118 is rotatably mounted on the supporting shaft 116. On the other hand, to the bottom surface of the upper wall 6 of the main body 4 is fixed a cylindrical braking member 120. As shown by a solid line in FIG. 10, when the cylinder mechanism 46 is stretched, the wheel 118 is isolated from the braking member 120, and the wheel 118 in contact with the surface 34 can freely rotate. Thus, the moving unit 2A is set in a movable state. On the other hand, if, as shown by a two-dot chain line in FIG. 10, the cylinder mechanism 46 is contracted, the wheel 118 is slightly lifted and depressed by the braking member 120. Accordingly, the rotation of the wheel 118 is braked. The moving unit 2A in which the braked wheel 118 is contacted with the surface 34 is set in a state in which it is difficult of starting to move, and thus, in a surface-engaging state.

In the modified example shown in FIG. 9 or 10, the braking member is pressed against the wheel to apply a brake to it, and consequently, set the moving unit 2A or 2B in a surface-engaging state. If desired, the wheel may be braked by other suitable means. For example, a wheel may be mounted on a supporting shaft via a known one-way clutch which can change the rotating direction. When in this case in FIG. 10, for example, the moving unit 2A is to be moved in the right direction, the one-way clutch is adapted to permit rotation in the counter-clockwise direction of the wheel, and thus, the moving unit 2A is set in a movable state. Thus, the moving unit 2A is set in a movable state. On the other hand, if to move the moving unit 2B (see FIG. 1) to the right direction, it is desired to set the moving unit 2A in a surface-contacting state in which its movement to the right is not permitted, the one-way clutch may be set in a condition in which the rotation of the wheel in the clockwise direction is permitted.

Figure 11:
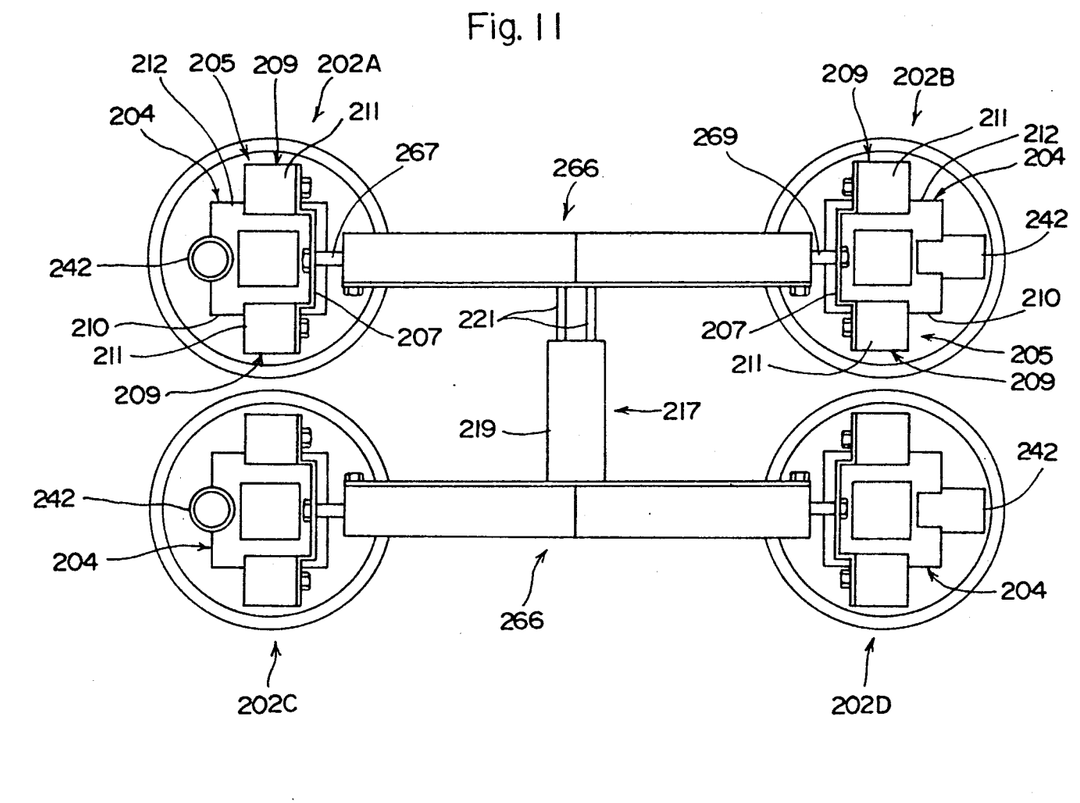
FIG. 11 is a plan view of another example of the device constructed in accordance with this invention.
Figure 12:
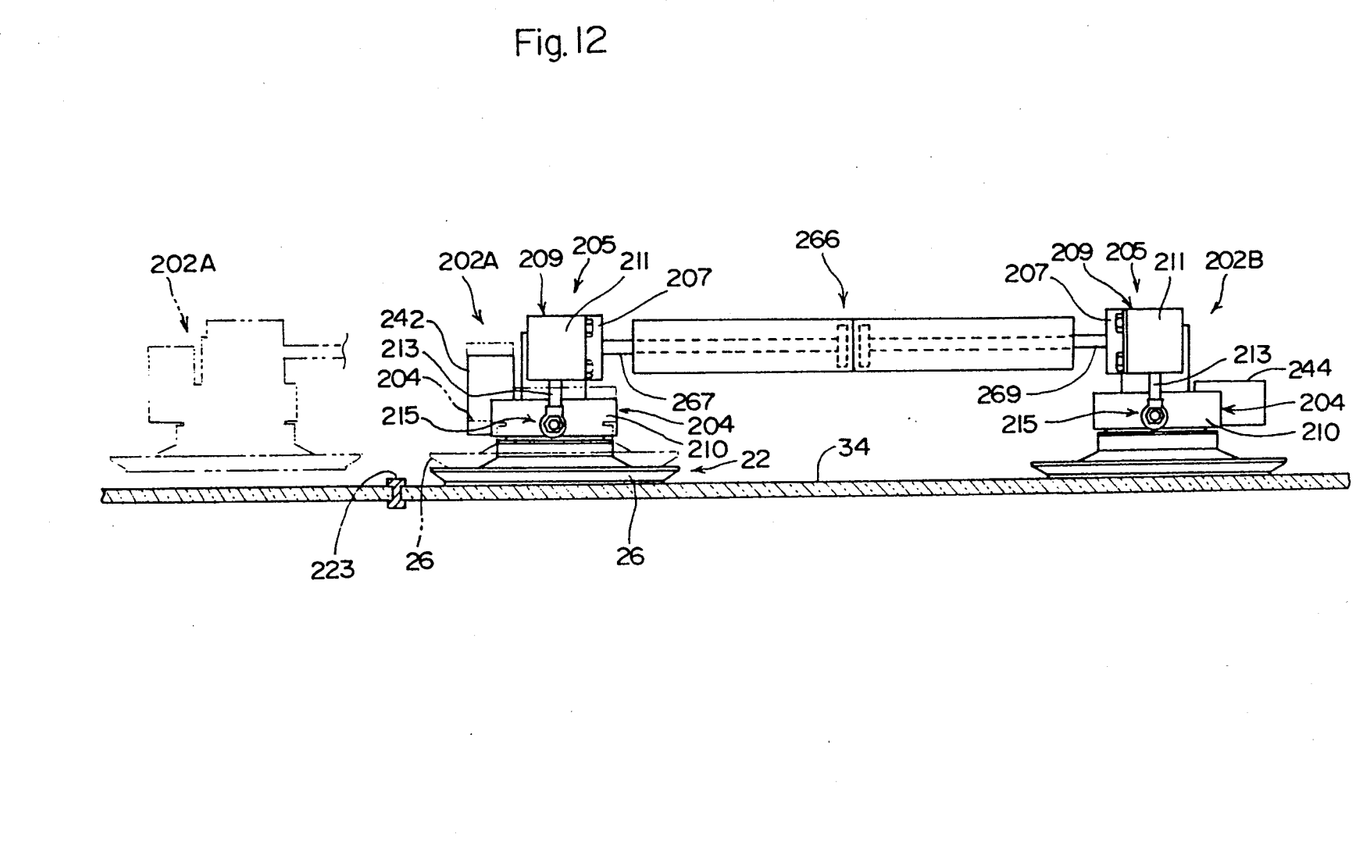
FIG. 12 is a side elevation of the device shown in FIG. 11.

FIGS. 11 and 12 illustrate other embodiments of the device constructed according to this invention. The device in these embodiments is provided with four moving units 202A, 202B, 202C and 202D. The structures of these moving units are substantially the same as the structure of the moving units 2A shown in FIGS. 1 to 5 except that the position of a flow opening formed in a main body 204, the position and the extending direction of a flow pipe 242 fixed to the flow opening are slightly different.

The moving unit 202A and the moving unit 202B form a pair, and the moving units 202C and 202D also constitute a pair. The pair of the moving units 202A and 202B will first be described. These moving units 202A and 202B are linked to each other by a coupling means 266. The coupling means 266 is formed of a composite cylinder mechanism constructed by connecting the cylinder ends of two ordinary pneumatic cylinder mechanisms, and has two rods 267 and 269 projecting in mutually opposite directions. The coupling means 266 is linked to main bodies 204 of the moving units 202A and 202B via a selective isolating means 205. More in detail, a connecting bracket 207 is fixed to each of the forward end portions of the rods 267 and 269 of the coupling means 266. Cylinders 211 of two pneumatic cylinder mechanisms 209 are fixed to the connecting bracket 207. (The cylinder mechanism 209 is connected to a compressed air source via a suitable pneumatic pressure circuit, although this feature is not shown in the drawings.) Two cylinder mechanisms 209 extending vertically with a space in a lateral direction constitute the selective isolating means 205. Downwardly projecting rods 213 of the two cylinder mechanisms 209 are conveniently connected to side wall 210 or 212 of the main body 204 of the moving unit 202A or 202B via a universal coupling permitting tilting in any desired direction. In the illustrated embodiment, the rod 213 of the cylinder mechanism 209 is connected to a side wall 210 or 212 of the main body 204 of the moving unit 202A or 202B via the joining mechanism including ball-and-socket joints.

The structure of the pair of the moving units 202C and 202D is substantially the same as that of the moving units 202A and 202B. The coupling means 266 in the pair of the moving units 202A and 202B extends substantially parallel to the coupling means 266 in the pair of the moving units 202C and 202D. The two coupling means 266 are connected to each other by a pair joining means 217. This pair joining means 217 is constructed of a two-rod type pneumatic cylinder mechanism having two rods 221 which are stretched and contracted as a unit. (This cylinder mechanism is also connected to a compressed air source via a suitable pneumatic pressure circuit, although this feature is not depicted in the drawings.) The pair joining means 217 extends substantially perpendicularly to the direction in which the coupling means 266 in each pair extends. The cylinder 219 of the pair joining means 217 is fixed to the side surface of the cylinder of the coupling means 266 in the pair of the moving units 202C and 202D, and the forward end portions of the two rods 221 of the pair joining means 217 is fixed to side surface of the cylinder of the coupling means 266 in the pair of the moving units 202A and 202B.

The operation of the device shown in FIGS. 11 and 12 will be described below. For example, in the device including the four moving units 202A to 202D, the moving units 202A and 202B forming a pair are set in a movable state and the moving units 202C and 202D forming another pair are set in a surface-engaging state, and the pair joining means 217 constructed of a cylinder mechanism is stretched (or contracted). Thus, the moving units 202A and 202B are moved as a unit in an upward direction (or in a downward direction) in FIG. 11 so that the surface 34 which may be a glass structure in a building can be cleaned. It is of course possible to set the pair of the moving units 202A and 202B in a surface-engaging state and the pair of the moving units 202C and 202D in a movable state, and to stretch or contract the pair joining means 217, and thus to move the pair of the moving units 202C and 202D. Furthermore, only a specific one of the four moving units, for example only the moving unit 202A, can be moved. In this case, the moving unit 202A alone is set in a movable state and the moving unit 202B (and the moving units 202C and 202D) in a surface-engaging state. And, one of the rods 267 in the coupling means 266 joining the units 202A and 202B is stretched or contracted. Thus, the moving unit 202A is moved in a right direction or (left direction) in FIG. 11.

In the device illustrated in FIGS. 11 and 12, the following fact should be noted. When the selective isolating means 205 constructed of the cylinder mechanism 209 is stretched in each of the moving units 202A, 202B, 202C and 202D, each of the moving units 202A to 202D is positioned at its own operation position as shown by a solid line in FIG. 12, and the seal portion 26 of the member 22 is in contact with the surface 34 which may be a glass structure of a building. And, each of the moving units 202A, 202B, 202C and 202D is set either in a movable state or in a surface-engaging state. If only the selective isolating means 205 of the moving unit 202A is to be contracted, the reduction of the pressure in the pressure-reduction space in the moving unit 202A is eliminated by communicating the pressure-reduction space with the atmosphere before or simultaneously with the contraction. Thus, the suction-adhering to the surface 34 of the moving unit 202A is released. When in this state the selective isolating means 205 is contracted, the entire moving unit 202A is raised to the isolated position, and the moving unit 202A as a whole including the seal member is isolated upwardly from the surface, as shown by a two-dot chain line in FIG. 12. Accordingly, if a protrusion 223 such as a glass frame is present on the surface 34 and the moving unit 202A adjoins the protrusion 223, the moving unit 202A is elevated to the isolated position shown by a two-dot chain line in FIG. 12, and then the coupling means 266 is stretched. As a result, as shown by a two-dot chain line in FIG. 12, the moving unit 202A is moved while it is elevated onto the isolated position, and move over the protrusion 223. Then, the selective isolating means 205 in the moving unit 202A is stretched to lower the moving unit 202A again to the operating position and the pressure-reduction-space in the moving unit 202A is reduced in pressure so that the moving unit 202A may again be suction-adhered to the surface 34. If required, it is possible to keep the pair of the moving units 202A and 202B (or the pair of the moving units 202C and 202D) at an isolated position and to stretch or contract the pair joining means 217 so that the pair of the moving units 202A and 202B (or the pair of the moving units 202C and 202D) may as a unit move over the protrusion 223.

While the specific examples and the modified examples of the device of this invention have been described hereinabove with reference to the accompanying drawings, it should be understood that various changes and modifications may be made without departing from the scope of the invention described and claimed herein.

What we claim is:

1. A device capable of moving along a surface, comprising:
   at least two moving units;

coupling means for linking said moving units, said coupling means including stretching and contracting means for moving said moving units closer and further apart, said moving units each having a main body with an engaging member mounted thereon, each of the moving units having disposed therein a state setting means for selectively setting each of the units in a movable state for movement along the surface and in a surface-engaging state for engaging the surface, wherein, when one unit is set in the movable state and the other unit in the surface-engaging state and the coupling means is stretched or contracted by means stretching and contracting means, said one unit set in the movable state is moved along the surface in association with the movement of said coupling means, said state setting means including traveling means selectively positionable at a protruding position and a receded position, such that, when the traveling means is positioned at the protruding position, the traveling means makes contact with the surface and the engaging member is isolated from the surface so as to set the movable state, and, when the traveling means is positioned at the receded position, the traveling means is isolated from the surface and the engaging member makes contact with the surface so as to set the surface-engaging state, each of said moving units including a seal member mounted on said main body and defining a pressure-reduction space with respect to the surface, and a pressure-reduction means for reducing pressure in the pressure-reduction space, whereby reducing the pressure of the pressure-reduction space suction-adheres said moving units to the surface.

2. The device of claim 1 wherein the traveling means is mounted on the main body via a cylinder mechanism, and by the stretching and contracting of the cylinder mechanism, the traveling means is positioned selectively at the protruding position and the receded position.

3. The device of claim 1 wherein the traveling means is constructed of at least one wheel.

4. The device of claim 1 wherein the traveling means is constructed of at least one ball caster.

5. The device of claim 1 wherein the traveling means is constructed of a sliding member formed of a material having a low coefficient of friction 6. The device of claim 1 wherein the traveling means is constructed of a high-pressure fluid cushioning means.

7. The device of claim 1 wherein the engaging member is formed of a material having a high coefficient of friction.

8. The device of claim 7 wherein the engaging member is formed of a synthetic rubber.

9. The device of claim 1 wherein the coupling means joining the moving units to each other is constructed of a cylinder mechanisms.

10. The device of claim 9 wherein the cylinder mechanism is connected to each of the moving units by means of a universal coupling.

11. The device of claim 1 wherein the coupling means joining the moving units to each other is constructed of a pair of cylinder mechanisms which are arranged parallel to each other.

12. The device of claim 1 wherein each of the moving units includes a main body, the joining means is linked to the main body of each of the units via a selective isolating means for selectively positioning the main body at the operating position and an isolated position, and when the main body of one unit is held at the operating position by the selective isolating means regarding said one unit, and in this state, the main body of the other unit is held at the isolated position by the selective isolating means regarding the other unit, the other unit as a whole is isolated from the surface.

13. The device of claim 12 wherein the selective isolating means is constructed of a cylinder mechanism.

14. The device of claim 13 wherein the cylinder mechanism is liked to the main body of the unit via a universal coupling.

15. The device of claim 12 which has two pairs of moving units, each unit consisting of two moving units linked to each other via the coupling means, and the joining means in the pair of moving units are connected to each other by a pair joining means capable of being stretched or contracted.

16. The device of claim 15 wherein the stretching and contracting directions of the coupling means in the pair of the moving units are substantially parallel to each other, and the stretching and contracting directions of the pair joining means are substantially perpendicular to the stretching and contracting direction of the coupling means.

17. The device of claim 15 wherein the pair joining means is constructed of a cylinder mechanism.

18. The device of claim 1 wherein said main body is rigid.

19. The device of claim 1 wherein said main body is semirigid.

20. A device of capable of moving along a surface, comprising:

at lease two moving units, coupling means, for linking said moving units, said coupling means including stretching and contracting means for moving said moving units closer and further apart said moving units each having a main body with an engaging member mounted thereon, each of the moving units having disposed therein a state setting means for selectively setting each of the units in a movable state for movement along the surface and in a surface-engaging state for engaging the surface, wherein, when a first of said moving units is set in the movable state and a second of said moving units is set int he surface-engaging state and the coupling means is stretched or contracted by said stretching and contracting means, said first unit is moved along the surface in association with the movement of said coupling means, each of said moving units including a seal member mounted on said main body so as to define a pressure-reduction space with respect to the surface and a pressure-reduction means for reducing pressure in the pressure reduction space so as to suction-adhere said moving units to the surface, and said seal member and said pressure reduction means being dimensioned and arranged such that said first and second moving units remain suctionally adhered to the surface both when moving with respect to the surface and when in a surface engaging state.

21. A device as recited in claim 20 wherein said state setting means includes traveling means selectively positionable at a protruding position and a receded position, such that, when the traveling means is positioned at the protruding position, the traveling means makes contact with the surface and the engaging member is isolated from the surface so as to set the movable state, and, when the traveling means is isolated from the surface and the engaging member makes contact with the surface so as to set the surface engaging state.

22. The device of claim 20 wherein each of the moving units includes a main body, said state setting means including a traveling means mounted on said main body and held in contact with the surface and a braking means for selectively applying a braking action to the traveling means, and when said braking means is free from contact with said traveling means, the movable state is set, and, when a braking action is applied to the traveling means, the surface-engaging state is set.

23. The device of claim 20 wherein each of the moving units includes a main body, the state setting means includes a traveling means mounted on said main body and held in contact with the surface, and a braking means for selectively applying a braking action to the traveling means, and when a braking action is not applied to the traveling means, the movable state is set, and when a braking action is applied to the traveling means, the surface-engaging state is set.

24. The device of claim 23 wherein the traveling means is constructed of at least one wheel, and the braking means includes a braking member to be selectively depressed against the wheel.

* * * * *